June 5, 1956  H. LITTLE  2,749,135
FEED COLLET
Filed Sept. 16, 1953
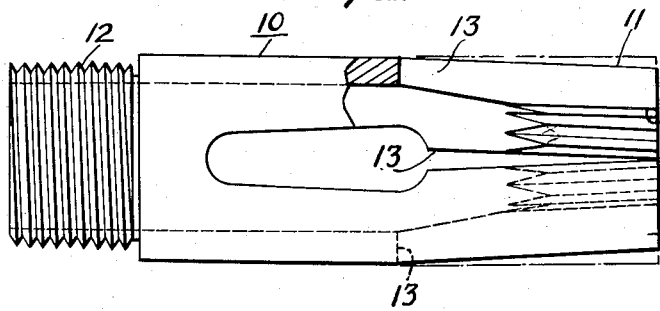
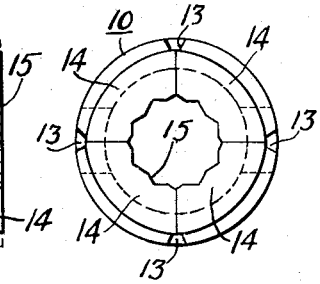
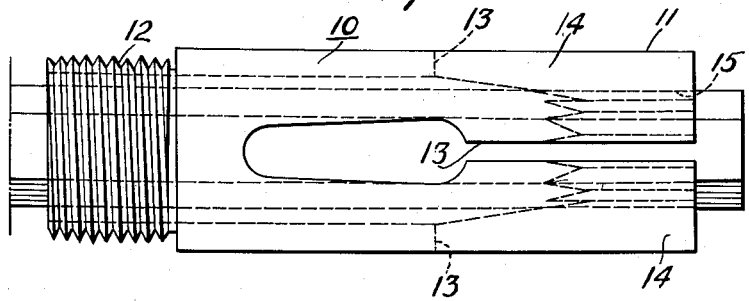
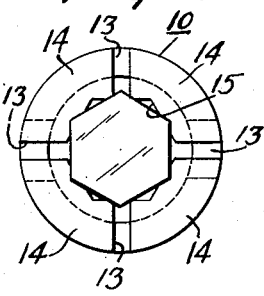
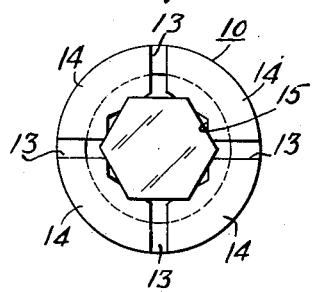
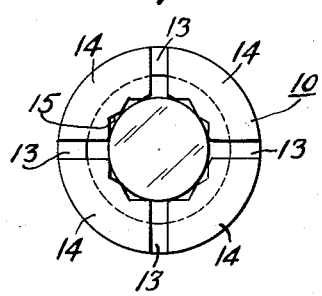
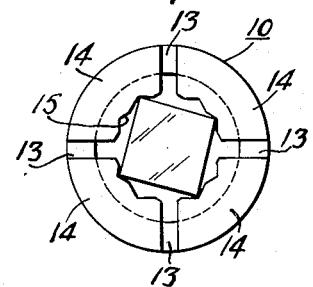
Inventor:
Henry Little
by his Attorneys
Howson &
Howson

2,749,135

FEED COLLET

Henry Little, Hatboro, Pa., assignor to Standard Pressed Steel Co., Jenkintown, Pa., a corporation of Pennsylvania Application September 16, 1953, Serial No. 380,507

1 Claim. (Cl. 279—41)

This invention relates to improvements in feed collets of the type used in automatic machine tools.

In prior art constructions it is known to provide a feed collet of the spring type with stock gripping fingers bored to accommodate round stock and having angular grooves corresponding to the conformation of hexagonal stock. I have found that when this type of collet is used, the surfaces embracing the sides of hexagonal stock wear excessively and when round stock is used, objectionable scoring results. Furthermore, hexagonal stock is frequently displaced with relation to these angular grooves so that the projecting corners thereof displace the fingers outwardly, thus causing the latter to fracture.

With the foregoing in mind, a primary object of the invention is to provide a feed collet which will effectively engage and propel bar stock intermittently through an automatic screw machine regardless of the cross-sectional conformation thereof.

More specifically, the invention contemplates a feed collet of the spring type wherein the stock gripping fingers are bored so that the bar stock will not displace the stock gripping fingers beyond the elastic limit thereof.

The invention resides further in certain structural details hereinafter described and illustrated in the attached drawings wherein:

Fig. 1 is an elevational view of a feed collet made in accordance with the invention.

Fig. 1A is an end elevational view of the feed collet of Fig. 1.

Fig. 2 is a side elevational view of the feed collet of the present invention shown in the position it assumes when the hexagonal bar stock is inserted;

Fig. 2a is an end elevational view of the feed collet shown in Fig. 2;

Fig. 3 is an end elevational view of the feed collet, similar to Fig. 2a, but showing the hexagonal stock with parallel horizontal faces;

Fig. 4 is an end elevational view of the feed collet, similar to Fig. 2a, but showing bar stock circular in cross-sectional conformation; and Fig. 5 is an end elevational view of the feed collet, similar to Fig. 2a, but showing feed stock of square cross-sectional conformation.

With reference to the drawing and more particularly to Fig. 1, it will be seen that the feed collet therein illustrated comprises a sleeve 10 with a diametrically reduced bore 11 on one end thereof and a threaded portion 12 at the other end thereof to receive the operative elements of the propelling mechanism of the screw machine (not shown). A plurality of longitudinally extending kerfs 13 define the stock gripping fingers 14. In this instance, four kerfs are provided forming four fingers which engage the bar stock uniformly. Certain oppositely disposed kerfs are enlarged at the inner ends thereof to accommodate a spanner wrench for adjusting the position of the sleeve 10 about the stock as desired.

In Fig. 1a it will be seen that the bore 11 of the tubular member is provided with an internal bore 15 of double hexagonal cross section. This particular cross section is shown by way of example only, it being understood that a twelve sided polygon could be employed, or any polygon that has a number of sides that are a multiple of the most commonly used stock cross sections. Fig. 2 shows the tubular member 10 in the position it assumes when embracing bar stock. It will be seen that the fingers 14 are forced outwardly so that the bore of the tubular member 10 is substantially equal throughout. Fig. 2a shows the internal bore of the collet with the bar stock inserted.

Should the bar stock be inserted so that it would not engage the depressions of one hexagon, it would readily be received in the depressions of the other hexagon. This particular bore conformation will also receive round stock and stock of other polygonal shapes without undue expansion of the fingers, as clearly shown in Figs. 3, 4, and 5. It will be clear that both square and hexagonal stock can be received without undue expansion of the stock-gripping fingers in internal bores having a number of grooves that is a multiple of four and six i. e. twelve, twenty-four, etc.

I claim:

In a feed collet for polygonal stock, a tubular body having longitudinal slits at one end defining a plurality of resilient terminal stock-gripping fingers, said fingers having their inner faces longitudinally recessed to afford a plurality of uniform contiguous grooves each having an included angle corresponding to the angle between the adjoining faces at the respective corners of the polygonal stock and having twice the number of said corners.

References Cited in the file of this patent

UNITED STATES PATENTS

| | | |
|---|---|---|
| 1,473,188 | Kramp et al. | Nov. 6, 1923 |
| 2,069,882 | Hall | Feb. 9, 1937 |
| 2,502,587 | Phipps | Apr. 4, 1950 |